(12) United States Patent
Naghizadeh et al.

(10) Patent No.: US 11,447,085 B2
(45) Date of Patent: Sep. 20, 2022

(54) 3D TIME OF FLIGHT ACTIVE REFLECTING SENSING SYSTEMS AND METHODS

(71) Applicant: Joyson Safety Systems Acquisition LLC, Auburn Hills, MI (US)

(72) Inventors: Hamid Naghizadeh, Orchard Lake, MI (US); Leonard Cech, Brighton, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 113 days.

(21) Appl. No.: 16/983,542

(22) Filed: Aug. 3, 2020

(65) Prior Publication Data

US 2021/0016736 A1 Jan. 21, 2021

Related U.S. Application Data

(63) Continuation of application No. 15/834,664, filed on Dec. 7, 2017, now Pat. No. 10,730,465.

(Continued)

(51) Int. Cl.
*G01S 7/40* (2006.01)
*B60R 21/015* (2006.01)
(Continued)

(52) U.S. Cl.
CPC .. *B60R 21/01534* (2014.10); *B60R 21/01538* (2014.10); *B60R 21/01542* (2014.10);
(Continued)

(58) Field of Classification Search
CPC ........ B60R 21/01534; B60R 21/01538; B60R 21/01542; B60R 2022/4816; G01S 7/4808;
(Continued)

(56) References Cited

U.S. PATENT DOCUMENTS 6,302,438 B1 10/2001 Stopper et al.
6,628,390 B1 9/2003 Johnson
(Continued)

FOREIGN PATENT DOCUMENTS

CN 102301405 A 12/2011
CN 103748479 A 4/2014
(Continued)

OTHER PUBLICATIONS

Machine translation for JP 2010-125882, IDS (Year: 2010).*
(Continued)

*Primary Examiner* — Qian Yang
(74) *Attorney, Agent, or Firm* — Meunier Carlin & Curfman LLC (57) ABSTRACT

The system and method provide for identification of dynamic objects in an enclosed space and the presence of a component in a primary location. The system uses an active electro-optical 3D sensor, such as a three-dimensional time of flight camera, to identify the presence or absence of a reflected pulse, to determine, for example, proper placement of a seat belt, or a change in characteristics of a reflected pulse to determine a change in location, and thus possible movement, of a living creature in a vehicle, for example.

19 Claims, 4 Drawing Sheets

Related U.S. Application Data (60) Provisional application No. 62/431,185, filed on Dec. 7, 2016.

(51) Int. Cl.
| | |
|---|---|
| *G01S 7/48* | (2006.01) |
| *G01S 17/58* | (2006.01) |
| *G01S 17/894* | (2020.01) |
| *G01S 17/89* | (2020.01) |
| *G06V 20/59* | (2022.01) |
| *G01S 7/4865* | (2020.01) |
| *G08B 21/24* | (2006.01) |
| *B60R 22/48* | (2006.01) |
| *G08B 21/22* | (2006.01) |
| *G01S 7/497* | (2006.01) |
| *G01S 17/26* | (2020.01) |

(52) U.S. Cl.
CPC ............ *G01S 7/4808* (2013.01); *G01S 17/58* (2013.01); *G01S 17/89* (2013.01); *G01S 17/894* (2020.01); *G06V 20/593* (2022.01); *B60R 2022/4816* (2013.01); *G01S 7/4865* (2013.01); *G01S 7/497* (2013.01); *G01S 17/26* (2020.01); *G06T 2207/30268* (2013.01); *G08B 21/22* (2013.01); *G08B 21/24* (2013.01)

(58) Field of Classification Search
CPC ........ G01S 17/58; G01S 17/89; G01S 17/894; G01S 7/4865; G01S 7/497; G01S 17/26; G06K 9/00838; G06T 2207/30268; G08B 21/22; G08B 21/24
See application file for complete search history.

(56) References Cited

U.S. PATENT DOCUMENTS

| | | | |
|---|---|---|---|
| 8,818,703 B2 | 8/2014 | Harada | |
| 9,599,712 B2 | 3/2017 | Van Der Tempel et al. | |
| 9,922,427 B2 | 3/2018 | Dielacher et al. | |
| 10,540,896 B2 | 1/2020 | Kitano | |
| 2001/0003168 A1 | 6/2001 | Breed et al. | |
| 2005/0012055 A1 | 1/2005 | Chien | |
| 2007/0195990 A1 | 8/2007 | Levy | |
| 2007/0206836 A1 | 9/2007 | Yoon et al. | |
| 2008/0048887 A1 | 2/2008 | Aoki et al. | |
| 2013/0100250 A1 | 4/2013 | Raskar et al. | |
| 2013/0123015 A1 | 5/2013 | Jung et al. | |
| 2013/0235364 A1 | 9/2013 | Kyung | |
| 2014/0330479 A1 | 11/2014 | Dolgov et al. | |
| 2015/0146928 A1* | 5/2015 | Kim | G06T 7/251 382/103 |
| 2015/0283974 A1 | 10/2015 | Schlittenbauer et al. | |
| 2015/0319329 A1* | 11/2015 | Matsuzawa | H04N 1/028 358/475 |
| 2016/0259057 A1 | 9/2016 | Ito | |
| 2017/0146656 A1* | 5/2017 | Belsley | G01S 17/66 |

FOREIGN PATENT DOCUMENTS

| | | |
|---|---|---|
| CN | 105182357 A | 12/2015 |
| JP | H06-036310 U | 5/1994 |
| JP | 2002-081935 A | 3/2002 |
| JP | 2010125882 A | 6/2010 |
| WO | 9215839 A1 | 9/1992 |
| WO | 2013165569 A1 | 11/2013 |
| WO | 2015/075926 A1 | 5/2015 |
| WO | 2016063028 A1 | 4/2016 |
| WO | 2016/117060 A | 7/2016 |

OTHER PUBLICATIONS

International Search Report and Written Opinion issued for Application No. PCT/US2017/065064, dated Mar. 19, 2018.
Extended European Search Report dated Apr. 14, 2020, issued for Application No. EP 17878103.
Communication Pursuant to Article 94(3) EPC, issued for European Application No. 17878103.5, dated Jul. 1, 2021.
Office Action Issued for Japanese Patent Application No. 2019-530141, dated Aug. 10, 2021.
Office Action Issued for Chinese Application CN 201780081393.5, dated Aug. 18, 2021.

* cited by examiner

3D TIME OF FLIGHT ACTIVE REFLECTING SENSING SYSTEMS AND METHODS

CROSS REFERENCE TO RELATED APPLICATIONS

This application claims priority to and incorporates by reference both U.S. application Ser. No. 15/834,664, filed on Dec. 7, 2017, and U.S. Provisional Patent Application 62/431,185 filed on Dec. 7, 2016, with both applications entitled "3D Time of Flight Active Reflecting Sensing Systems and Methods."

TECHNICAL FIELD

This disclosure relates to monitoring of vehicle non-line of sight regions with active optical sensors and optically reflective integration, and more particularly to using a Time of Flight Reflecting Sensing System to detect changes in reflected images to detect the presence of a moving object.

BACKGROUND

Systems to detect the presence of a child in a child seat have been developed and tested where the sensing systems are integrated directly into the child seat structure, as indicated in recent NHTSA report (DOT HS 812 187, July 2015). These systems are based on detection of the child seat through several sensing mechanisms, including the measurement of pressure, force, latching clip detection, etc. Such systems are designed to include electronics within or on the seat for detection and communication to/from the vehicle and/or to/from cell phones. The systems contain microprocessors that take the sensor and vehicle information as inputs, and monitor conditions where the child may be left behind, and a range of potential countermeasures can be taken, including initiating a warning through the vehicle systems (e.g. horn alarm); modifying the vehicle cockpit (e.g., reducing/increasing cabin temperature); and initiating a warning through telematics (e.g., sending a warning to the parent/driver).

Additionally, detection of child seat occupancy has been studied using a two-dimensional (2-D) camera, a three-dimensional (3-D) camera and other active electromagnetic methods such as ultrasonic, radar, and acoustics. These systems have shown the potential to detect the child seats and classify them as occupied or un-occupied. Another potential method is based on the use of seat weight detection systems, possibly including belt tension sensor(s). All of the above methods can be prone to incorrect classifications, due to clothing, due care, blocking obstructions, lack of motion by the occupant, etc. Moreover, many of these systems depend on sensing an expected location of an occupant, and cannot account for an occupant being separated from the sensed location.

SUMMARY

Accordingly, the present invention is directed to 3D time of flight active reflecting sensing systems and methods that address one or more of the problems due to limitations and disadvantages of the related art.

An advantage of the present invention is to provide a system for detecting dynamic objects in an enclosed space with an active electro-optical 3D sensor. For spaces out of the field of view of the sensor, a reflective surface capable of reflecting a wavelength corresponding to the active electro-optical 3D sensor is utilized. The reflective surface is in line of sight with the active electro-optical 3D sensor and is in line of sight of at least one volume of the enclosed space that is not in line of sight with the active electro-optical 3D sensor. If characteristics of light reflected by the reflective surface to the active electro-optical 3D sensor at a first time differ from characteristics of light reflected by the reflective surface to the active electro-optical 3D sensor at a second time, the sensor indicates a dynamic object is present in the enclosed space.

In another aspect of the present invention, further embodiment of detecting proper positioning of a device includes an active electro-optical 3D sensor and a reflective surface capable of reflecting a wavelength corresponding to the active electro-optical 3D sensor. The reflective surface is on a surface of a component such that, if the component is in a primary position, the reflective surface is in line of sight with the active electro-optical 3D sensor and out of line of sight with the active electro-optical 3D sensor if the component, or a portion of the component, is displaced from the primary position. If characteristics of light reflected by the reflective surface to the active electro-optical 3D sensor at a first time differ from characteristics of light known to indicate the component is in the primary position, the active electro-optical 3D sensor indicates displacement of the component.

An associated method includes detecting an object in a vehicle cabin, transmitting a pulse from a three-dimensional time of flight camera, and detecting a presence or absence of a returned pulse reflected to the three-dimensional time of flight camera. The method further includes measuring changes in characteristics of the returned pulse to determine change in objects within the enclosed space.

Further embodiments, features, and advantages of the sensor system disclosed herein, as well as the structure and operation of the various embodiments of the system and method, are described in detail below with reference to the accompanying drawings.

It is to be understood that both the foregoing general description and the following detailed description are exemplary and explanatory only, and are not restrictive of the invention as claimed.

DESCRIPTION OF DRAWINGS

The accompanying figures, which are incorporated herein and form part of the specification, illustrate a 3-D time of flight (TOF) active reflecting sensing system and methods. Together with the description, the figures further serve to explain the principles of the 3-D time of flight (TOF) active reflecting sensing system and methods described herein and thereby enable a person skilled in the pertinent art to make and use the same.

Like reference symbols in the various drawings indicate like elements.

DETAILED DESCRIPTION

The details of one or more embodiments of the disclosure are set forth in the accompanying drawings and the description below. Other features, objects, and advantages of the disclosure will be apparent from the description and drawings, and from the claims. It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The present system and processes use detection of changes in characteristics of reflected light (117) to overcome obscuration limitations to allow sensing of non-direct line of sight regions. The system uses active optical sensing in which an electrically and optically controlled light source is pulsed to emit optical energy at a specified intensity, duration, and pulse rate. Accordingly, for purposes herein, some embodiments of this disclosure refer to a "pulse of light" which may be considered a spatially and temporally modulated light pattern emitted from a light source (110, 210), such as an electro-optic ally controlled light source. The pulses of light result in reflected optical energy available for reception and processing at a sensor or camera or any imaging device (110A, 110B, 210) having a field of view adjusted to receive the reflected light. Preferably an imaging device (110A, 110B, 210) used as a sensor for purposes herein utilizes a pixelated sensing surface for receiving reflected light thereon. For example, the reflected light received at a sensor, camera, or any image detection apparatus may be a function of the shape and material properties of the surfaces from which the light is reflected. The reflected optical energy is reflected off of objects (160, 320, 360, 490, 495) (both living and inanimate) within a given three-dimensional space (190), and the system includes a multi-pixel detector which detects and quantifies the intensity of light at each pixel. Through additional signal processing steps, the detector and an associated image processor (i.e., a computer processor connected to computerized memory and the detector) can be used to form an intensity and/or distance image as shown in FIG. 3. In this regard, the sensor may be an electro-optical sensor configured to convert received/reflected light (117) into a plurality of electronic signals that can be processed to emulate patterns of objects in a given field of view.

Furthermore, characteristics of motion of non-living objects (320, 490, 495) differ greatly from motion associated with living creatures (160), and, therefore, are particularly distinguishable from animals which exhibit somatic and autonomic movements. Accordingly, the systems described herein (for example, those implemented with electro-optical sensors (110, 210) configured as 3-D Time of Flight sensors, referred to herein as "3-D TOF" sensors) can be used to discriminate and categorize various objects in a 3-D space, such as a vehicle interior or vehicle cabin (115), by analyzing how optical energy is affected or changed from a reference point when the optical energy is reflected off of the various objects. In one embodiment, the reference point may be a collective set of pixel data from an electro-optical sensor (110, 210), and the change may be measured as change in the time domain, frequency domain, or spatial domain. The change may also be a change in a property of the optical signal, such as intensity. According to example embodiments discussed herein, this disclosure illustrates systems and methods with which the objects can be classified within a vehicle compartment.

For purposes herein, therefore, and without limiting the disclosure to any one embodiment, categories of objects in a vehicle may be classified as follows, using the systems and methods described herein, to further illustrate the embodiments of this disclosure:

Class (1) Living, dynamic (160) (e.g., adults, children, toddlers, infants, pets);

Class (2) Living, non-dynamic (e.g., plants);

Class (3) Non-living, dynamic (360) (e.g., motive tools (e.g., battery operated drills, shakers) or toys (battery operated, moving dolls, cars, action figures);

Class (4) Non-living, semi-static (140, 240, 340) (e.g., objects that have a variety of controlled degrees of mechanical freedom or settings, for example, adjustable seating systems, seat belts, steering wheels, arm rests); and Class (5) Non-living, static (219) (e.g., objects fixed relative to the sensor such as headliner, supports such as a/b pillars around windows and structural details in a vehicle, floor/carpet/light mounts, seat-belt apertures, styling patterns (fabric patterns/trim).

In some applications, it may be desirable to sense objects of class (1) from all other objects (classes (2)-(5)). A 3-D time of flight (TOF) camera (110, 210) can be used in this way, but such a camera, or sensor, is limited to detecting objects that are fully, or at least mostly, in the direct line of sight (117C, 117D) of the camera. For this disclosure, the inclusion of optically reflective features, such as at least one reflective surface (219, 317) positioned in a vehicle compartment (115), can greatly expand the overall effective field of view of a camera/sensor within the vehicle compartment. For example, and without limiting this disclosure, within multiple classes, a system of reflective surfaces and associated camera/sensor installations in a vehicle can be used for at least the following purposes:

A. In regard to Class (5), a method and system as described herein may provide fixed calibration references for periodic or continuous calibration of a detector and illuminator system (110, 210) (e.g., a camera or 3-D TOF sensor and an associated light source);

B. In regard to Class (4), a method and system as described herein may serve to provide dynamic calibration references for assessing the adjustable state of a non-living, semi-static object (140, 240, 340) (e.g. seat moved forward, seat moved back, belt position and orientation, and, for example, proper belt use based on detection and discrimination of a target pattern on the belt). Another example is applying a reflective pattern surface (219) on a seat head-rest surface and being able to determine the seat angle based on a position and reflected light intensity pattern for any possible mechanical degree of freedom for the seat (240).

Figure 3A:
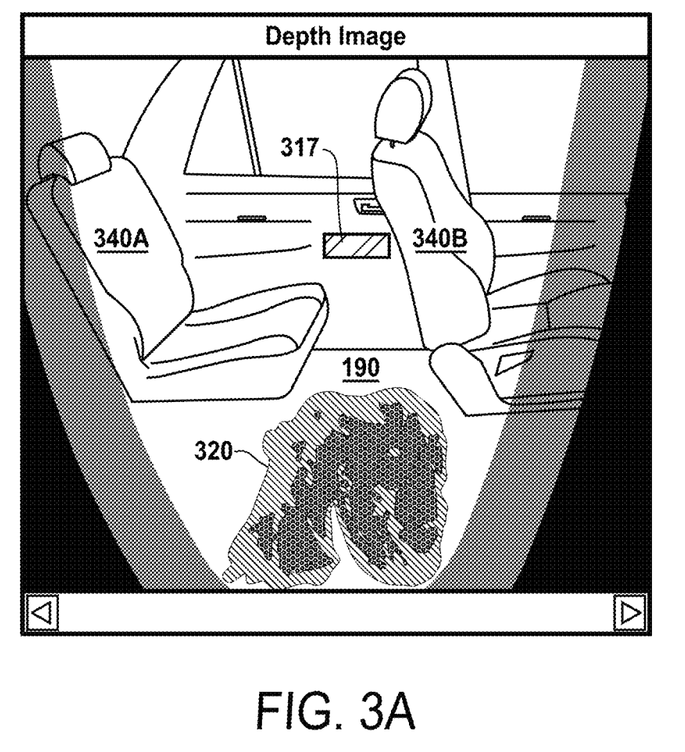
FIG. 3A shows an example of depth images of a vehicle footwell monitored through a fixed mirror according to principles of the present disclosure.
Figure 3B:
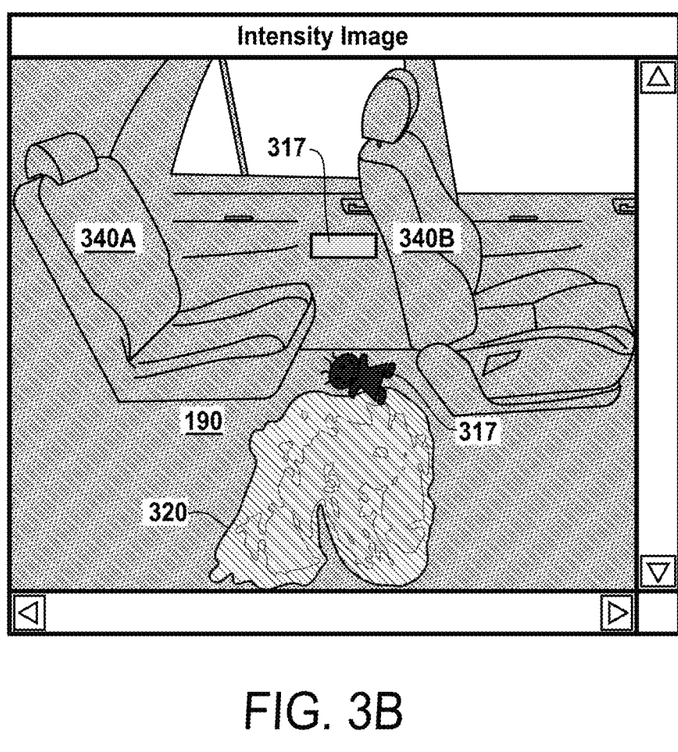
FIG. 3B shows an example of intensity images of a vehicle footwell monitored through a fixed mirror according to principles of the present disclosure.
Figure 4A:
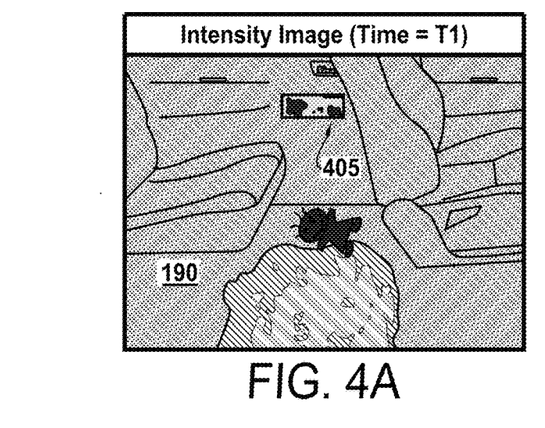
FIG. 4A shows an example of intensity images from a side view of a vehicle footwell monitored through a fixed mirror at time T1 according to principles of the present disclosure.
Figure 4B:
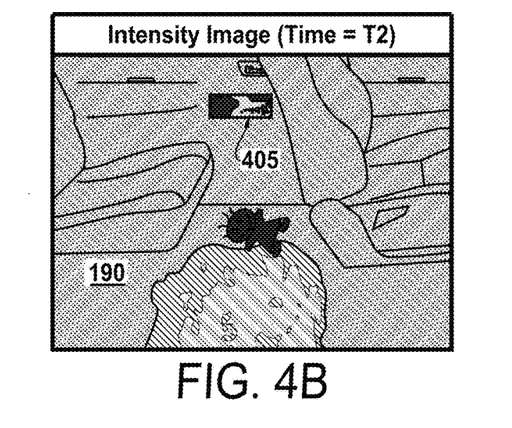
FIG. 4B shows an example of intensity images of a vehicle footwell as monitored from a side view through a fixed mirror at time T2 according to principles of the present disclosure.
Figure 4C:
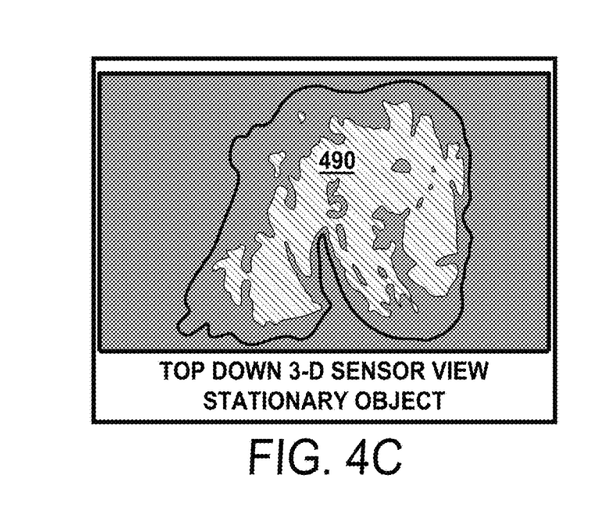
FIG. 4C shows top view intensity images of a vehicle footwell monitored through a fixed mirror according to principles of the present disclosure.
Figure 4D:
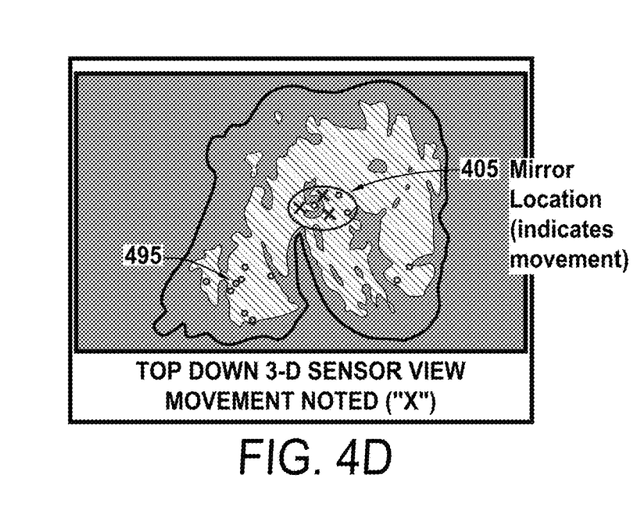
FIG. 4D shows top view intensity images of a vehicle footwell monitored through a fixed mirror according to principles of the present disclosure.

C. In further regard to Class (4), a method and system as described herein may provide a means to reflect light into those areas within a vehicle compartment obscured from direct line of site of a sensor or camera. Light reflected back from objects within the obscured area (190) can be detected by a properly positioned sensor (110) and provide information about objects within the obscured area, for example pattern recognition and/or motion of objects within the obscured area as shown in FIGS. 3-4.

D. In regard to Class (1), a method and system as described herein may monitor seatbelt (215) positions and/or an optically active/reflective pattern (219) on or near the seat belt relative to at least one occupant. In this way, the method and system enable a procedure to estimate a stature of the occupant and/or whether a seatbelt (215) is out of position from a previous position, a desired position, or a position that is required by transportation regulations. A reflective surface (130, 219, 317) where infrared (IR) light reflecting and infrared (IR) light absorbing surfaces can be used together to achieve any desired pattern, enhance detectability through pixel intensity and/or detected distance from the sensor. A printed or embroidered infrared (IR) sensitive/reflective pattern (219), which can include one or more kinds of material, can be placed on the belt (215) as to be easily detected/monitored by the active sensor to assess information about the occupant (e.g. the aforementioned proper belt use, occupant size/stature).

According to principles of the present invention, at least one 3-D TOF sensor, such as but not limited to, those marketed by ESPROS PHOTONICS® AG, is placed at a respectively predetermined location within a vehicle cabin. For example, sensors such as those sold under ESPROS's EPC™ series emit sinusoidal infrared light pulses with 5-20 MHz pulse repetition. While the present example contemplates sensors along the lines of the ESPROS EPC610™, EPC635™, and EPC660™, one of skill in the art would appreciate that other active electro-optical sensors can be used without deviating from the spirit and scope of this disclosure. Nothing in this disclosure should be interpreted as limiting this description to any one kind or brand of sensor, camera, or image detection apparatus. References to particular devices and brand names or merely for example. For example, although not described in detail here, there are increasingly wider bandwidth sensors (multi-spectral) that could be considered in the future, perhaps with wavelengths that are tunable or having several different active optical energy light sources to cover sensed bandwidth. These kinds of developments can be used according to principles of the present disclosure. Light operating frequencies may vary depending on the sensor used. One example sensor utilizes a wavelength in the range from 300 nm to 1050 nm. Sub-ranges in the near infrared spectrum of 950 nm-1050 nm are well within the scope of this disclosure as well.

The reflective material (e.g., the pattern (219) on a seatbelt (215), specifically chosen for its operability with the selected 3-D TOF sensor, is applied to predetermined locations within the vehicle cabin (115). As illustrated in the figures, the reflective material may comprise, in one non-limiting embodiment, a reflective surface (130, 219, 317) having a pre-determined configuration with a pattern of highly reflective regions and highly absorptive regions. In embodiments utilizing a reflective surface having a pattern as noted, the pattern may be configured to accommodate sensor parameters such that light reflected from the pattern to an associated sensor is readily discernible by sensor software. In this way, the sensor software more efficiently discerns positions, directional changes, and the like for a component bearing the pattern. In certain embodiments, the reflective surface (130, 219, 317) may include different materials exhibiting respective absorptive and reflective properties designed for a particular installation. The reflective and absorptive regions may be configured to exhibit optimal characteristics at desired wavelengths that coincide with an associated optimal operating range for an associated detector system. The reflective and absorptive regions described herein are only one implementation of a reflective surface, but it is noteworthy that non-limiting embodiments of the reflective surface may include a reflective, patterned surface configured for tracking by the sensor when light is reflected to the sensor from a recognizable pattern.

For example, a system and method disclosed herein may utilize an arrangement of multiple reflective surfaces (130A-130D) and associated cameras/sensors (110A, 110B) such that at least a primary portion of a first reflective surface (130A, 130B, 130D) is placed within or mostly within a direct line of sight (117A, 117C, 117D) to the 3-D TOF sensor (110A, 110B). Additional reflective material, i.e., at least a second reflective surface (130C), may be placed in a location not in a direct line of sight of the sensor, but in a line of sight (117B) of a primary portion of the first reflective surface (130A). Reflective material bearing the reflective surfaces may be placed on a movable component (e.g., the above described semi-static structures (140, 240) such as vehicle seats, windows, arm rests, and the like) that are adjustable to more than one physical position. Reflective surfaces on these movable but semi-static components within a vehicle cabin may be initially within the line of sight of the 3-D TOF sensor when the moveable component is in one position, but may be out of line of sight of the 3-D TOF sensor if the component, or a portion of the component, is displaced from the one position. For example, placement of reflective surfaces could be configured on a seat belt (215) that is in an image sensor's line of sight when properly worn by a vehicle occupant, but out of the line of sight if not in use by a vehicle occupant. This arrangement may allow for the sensor and associated computerized components to provide alarm functions when the seat belt is used improperly.

The reflective material, the reflective surfaces, and the configuration of the reflective and absorptive portions of respective patterns should be chosen according to the sensor being used. Semi-reflective surfaces other than simple mirrors, are also covered in this disclosure. The pattern used in a reflective surface can also be specified to optimize detectability within an associated sensor's wavelength range, which may, in certain example circumstances, not be detected at human visible wavelengths.

The surface does not need to be one hundred percent reflective or uniform, but in one non-limiting example the reflective surface is fixed relative to a sensor assembly, such as an illuminator and associated camera. When a plurality of reflective surfaces are properly configured within a three-dimensional space, such as a vehicle compartment, motion in a hidden space that is within a field of view of a reflective or semi-reflective surface will be subject to sensing as discussed herein, resulting in a changing pattern as sensed by the TOF imager. In one embodiment, the combination of the reflective surface and sensor need sufficient resolution to distinguish that something is moving, rather than necessarily distinguishing "what" is moving. In other words, this disclosure encompasses optically sensitive sensors and cameras for which resolution of the sensed optical energy or image may be tailored to match the need at hand. Recognizing movement of an object within an area requires significantly lower resolution compared to identifying the exact object therein. Other embodiments may sense both the movement and an identification of the object that is moving.

Figure 1:
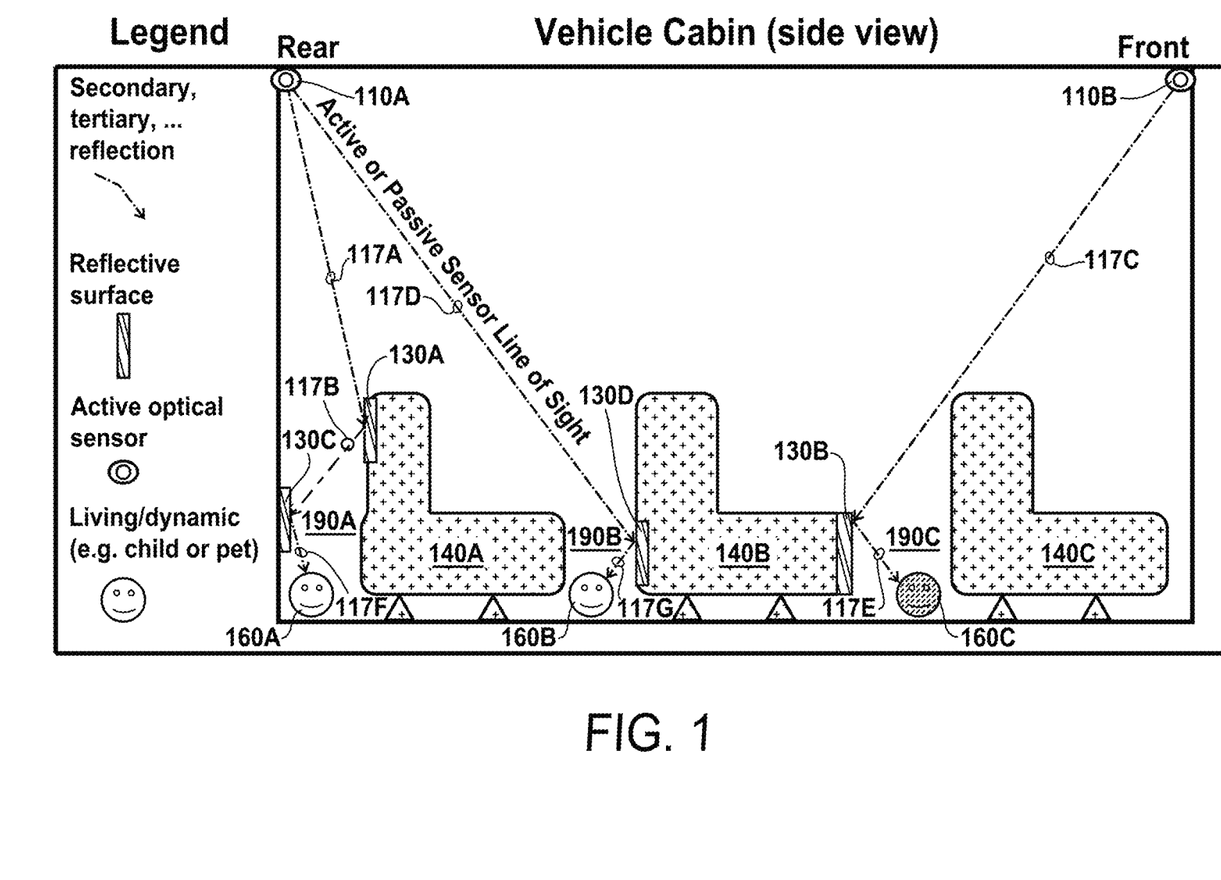
FIG. 1 illustrates a concept of detecting movement by monitoring secondary reflection in a vehicle cabin.

FIG. 1 illustrates a vehicle cabin (115) with exemplary interior vehicle components, in this case, passenger seats. As illustrated in this example, an active optical sensor (110B) is placed in a front-ward location of the vehicle cabin (115) and in a rear-ward location (110A) in the vehicle cabin. Highly reflective surfaces (130) are created, e.g., by application of a reflective material, at predetermined locations within the vehicle cabin. Locations of the reflective surfaces are chosen to maximize the intensity of primary, secondary, tertiary, etc., reflections from an area of interest (190) in the cabin to at least one of the active optical sensors. Placement of the reflective surfaces (130) can be used to allow measurement of reflection of obscured areas within the vehicle cabin.

Figure 2:
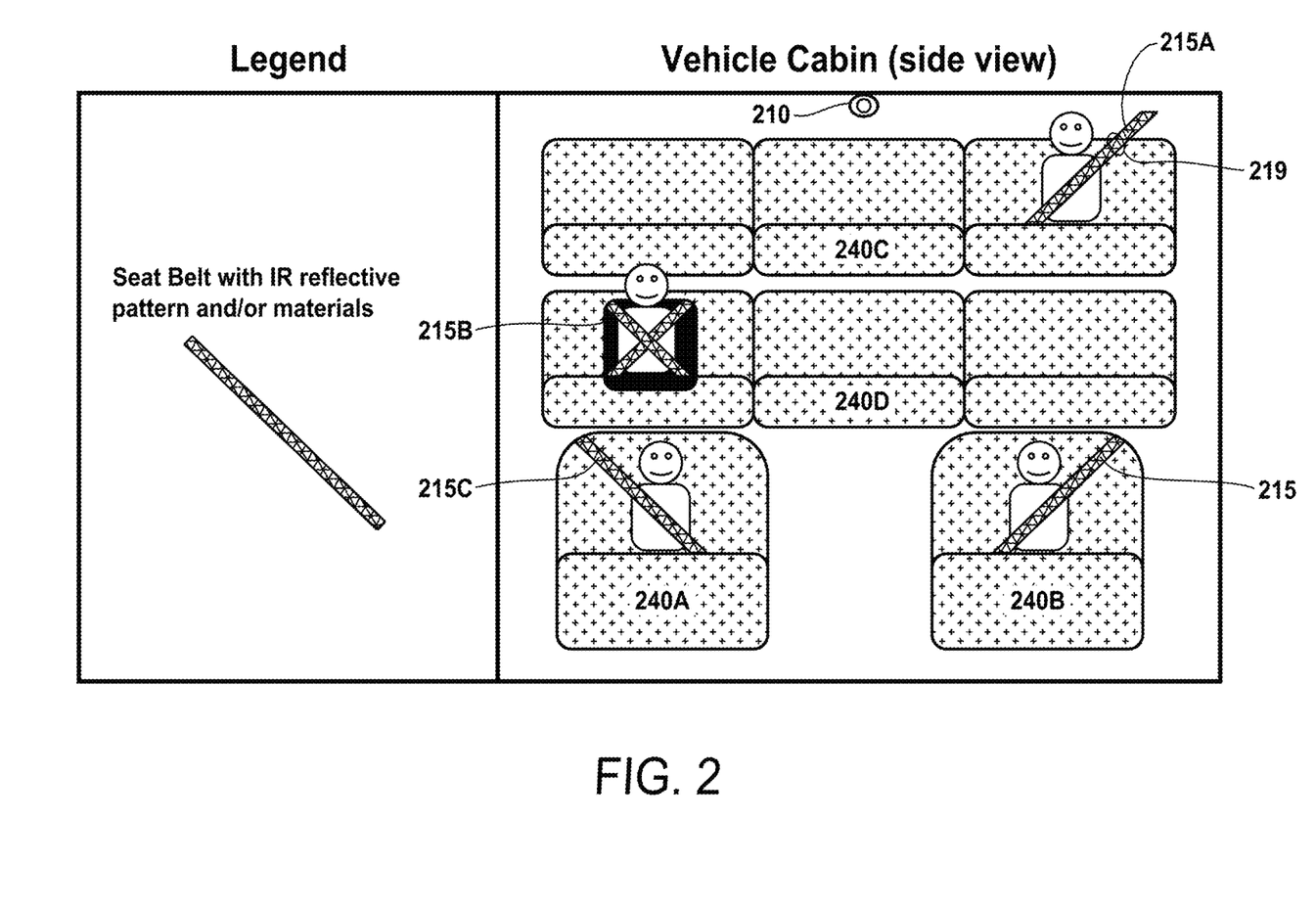
FIG. 2 illustrates monitoring vehicle occupants by location and proper seat belt use through a reflective pattern on a seat belt.

FIG. 2 illustrates reflective surfaces on vehicle components, namely seat belts (215). As illustrated, when a seat belt is worn by a vehicle occupant, the reflective material (219) is in line of sight of a front mounted TOF sensor (not shown). Serial pulses from the TOF sensor can provide information as to whether the emitted signal is reflected back to the camera or not, indicating whether the reflective material on a particular seat belt within the cabin is in a wearing position. This information can alone be used to determine whether a passenger occupies a seat within the cabin, or can be compared with other vehicle occupant sensor mechanisms to indicate whether a passenger may be in the vehicle but not wearing a seat belt. The present system can also be used to determine location (by measurement of return pulse timing) to determine the location of a passenger or component within the vehicle cabin. The reflective surface/material may have a predetermined pattern to assist in the location/distance measurements. In addition, certain highly reflective patterned surfaces, such as those surfaces encompassing mirrors, may be added to the vehicle cabin to aid in reflection.

According to principles of the present invention, in one example embodiment, light may be directed from a light source in a vehicle compartment (e.g., the 3-D TOF sensor may incorporate its own light source/illumination projector). The preferred optical signal directed to an object and reflected back to the sensor may be "coded" in the time or frequency domain or even in regard to physical dimensions, or spatial domain, for the optical signal. Accordingly, the relevant sensor only measures/responds to a predetermined coded light, while not responding to un-coded, external or ambient light and lighting changes. Moreover, current vehicle windows are coated or otherwise designed to filter certain light wavelengths. Thus, the TOF sensor operating frequency can be selected to be one that is filtered by the windows such that external light (e.g., light noise) within the vehicle cabin is minimized in the operating wavelength range for an associated sensor and system described herein.

In an aspect of the present invention, a 3-D TOF sensor is placed at an uppermost, farthest forward position of the vehicle cabin, for example, on the headliner by the rearview mirror or integrated with the rearview mirror assembly, with primary viewing angle facing toward the vehicle rear. Another 3-D TOF sensor is placed at the uppermost, farthest rearward position of the vehicle cabin, for example, by the upper rear utility light in a mini-van or SUV, with primary viewing angle facing toward the vehicle front. The viewing angle of the lens of the 3-D TOF sensor is contemplated to be approximately 90° to approximately 120° with a standard lens, but may be adapted by changing the lens as necessary for various applications.

FIG. 3 shows both an exemplary depth image produced by the 3-D TOF sensor and an exemplary intensity image of a footwell in a vehicle monitored through a fixed mirror. Illustrated are the mirror (317), a moving doll (360) as a model and a blanket (320). FIG. 4 shows intensity and depth images of the footwell at time T1 and time T2. A close inspection of the intensity images at T1 and T2 shows a slight change in the image reflected in the mirror (405), indicating movement of the object (the moving doll) (360) reflected in the mirror (405) between time T1 and time T2. The depth image at time T2 shows that there has been a depth change between time T1 and time T2, characterized by a change in depth measured by the 3-D TOF sensor. The depth changes are indicated by an overlay in the figure of red boxes that illustrate where the depth changes have been sensed. The blue boxes indicate unchanged depth at a particular location.

This technique provides a unique, low cost method to improve the performance and extend applications of active optical sensing system through calibration references (e.g. look for known/fixed locations where an object "should" be). Semi-dynamic state information can be determined through detection of references. Information about obscured regions (190) can be obtained from a single sensor. In other embodiments, output from additional sensors other than 3D TOF sensors may be used by associated software to add more opportunities for artificial intelligence operations. For example, with a moving object, image processing (stand-alone or with support from available sensors such as accelerometer signals) can help separate if a sensed motion is induced by the movement of the vehicle or the living object picked up within the field of view of the sensor. Similarly, comparing series of the sensed images along with known conditions of the vehicle movement, direction, velocity, acceleration and the like, can be used to determine or verify classifications of objects as living or dynamic in some way.

In one embodiment, a system for classifying objects within an identified volume of space (190) includes an electro-optical sensor (110) in communication with a processor and computerized memory storing computer-implemented software thereon. A reflective surface (130) capable of reflecting an optical signal back to the electro-optical sensor is positioned proximate the identified volume of space, wherein the reflective surface is at least partially within a first line of sight (117A, 117C, 117D) originating from the electro-optical sensor. The reflective surface is positioned relative to the identified volume of space such that a second line of sight originating from the reflective surface encompasses at least a portion of the identified volume of space. The optical signal reflected from the reflective surface back to the electro-optical sensor includes image data gathered by the reflective surface via the second line of sight (117B) into the identified volume (190). If characteristics of the optical signal as reflected by the reflective surface at a first time differ from later characteristics of the optical signal as reflected by the reflective surface at a second time, the sensor identifies movement data corresponding to the objects within the identified volume via the software. A first line of sight includes the image data gathered by the reflective surface such that an effective field of view for the electro-optical sensor comprises the first line of sight and at least a portion of the second line of sight. The system further includes computer controlled alarm functions stored in the memory and in communication with the processor, wherein the alarm functions are configured to activate an alarm in accordance with predetermined rules established in the software for categories of objects identified by the software with the movement data.

In another embodiment, the system further includes computer controlled alarm functions stored in the memory and in communication with the processor, wherein the alarm functions are configured to activate an alarm in accordance with predetermined rules established in the software for categories of objects identified by the software with the movement data.

In another embodiment, an indirect reflective surface (130C) defining a third line of sight (117F), wherein the indirect reflective surface is within the second line of sight (117B) originating at the reflective surface (130A) but is not within the first line of sight (117A) originating from the electro-optical sensor (110), and wherein the third line of sight originating (117F) from the indirect reflective surface includes at least a portion of the identified volume (190) that is not in the first line of sight originating with the active electro-optical sensor.

In another embodiment, a system for detecting proper positioning of a device includes the above noted electro-optical three-dimensional (3D) image sensor (110) and a reflective surface (130) capable of reflecting a wavelength corresponding to a wavelength operating range for the electro-optical three-dimensional (3D) image sensor, wherein the reflective surface is on a component such that, if the component is in a primary position. The reflective surface reflects first image data into a first line of sight (117A, 117C, 117C) originating at the electro-optical three-dimensional (3D) image sensor, and wherein the sensor is configured to generate movement data regarding the component from differences in the characteristics of light reflected by the reflective surface to the electro-optical three-dimensional (3D) image sensor. The component may be a semi-static structure (215, 240) within a vehicle, and the reflective surface reflects image data into the first line of sight for reception by the electro-optical (3D) sensor, wherein the software accesses position data corresponding to allowed degrees of freedom within which the component (215, 240) is allowed to operate without triggering the alarm, and wherein the software utilizes the position data and the image data in a decision to trigger the alarm.

An associated method allows for detecting an object within an enclosed space (115), and the steps include transmitting a pulse of light from a three-dimensional (3D) time of flight camera (110) into the enclosed space, detecting presence or absence of a returned pulse of light reflected to the three-dimensional (3D) time of flight camera; and measuring changes in characteristics of the returned pulse of light to determine changes in objects within the enclosed space. Presence of the returned pulse of light indicates a component (215, 240) within the enclosed space is in a primary position, and absence of the returned pulse indicates displacement of the component. If characteristics of light returned to the three-dimensional (3D) time of flight camera at a first time differ from characteristics of light returned to the three-dimensional (3D) time of flight camera at a second time, the sensor indicates that either a semi-static or a dynamic object is present in the enclosed space.

This disclosure includes concepts for developing software stored on non-volatile computer readable media to connect to, interact with, and/or control the imaging and sensing system described herein. For example, a processor and associated memory may be configured to execute computer readable commands in vehicle systems if a 3D TOF sensor detects movements in the image when the car is not in motion, a factor that would help verify a living, dynamic status for that object. Similarly, and without limiting this disclosure to any one embodiment, a detected movement may be identified as actual shifting of a non-living, non-dynamic class object (due to vehicle movement and braking). A series of images, analyzed by software executed by the processor herein, could distinguish that object from a living, dynamic object (possibly by the patterns of motion not matching the vehicle motion).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

The invention claimed is:

1. A system for classifying objects within an identified volume of space, comprising:
    an electro-optical sensor in communication with a processor and computerized memory storing computer-implemented software thereon;
    a reflective surface capable of reflecting an optical signal back to the electro-optical sensor;
    wherein the reflective surface is at least partially within a first line of sight originating from the electro-optical sensor;
    wherein the reflective surface is positioned relative to the identified volume of space such that a second line of sight originating from the reflective surface encompasses at least a portion of the identified volume of space;
    an indirect reflective surface defining a third line of sight, wherein the indirect reflective surface is within the second line of sight originating at the reflective surface but is not within the first line of sight originating from the electro-optical sensor, and wherein the third line of sight originating from the indirect reflective surface includes at least a portion of the identified volume that is not in the first line of sight originating with the active electro-optical sensor;
    wherein the optical signal reflected from the reflective surface back to the electro-optical sensor comprises image data gathered by the reflective surface via the second line of sight into the identified volume;
    wherein if characteristics of the optical signal as reflected by the reflective surface at a first time differ from later characteristics of the optical signal as reflected by the reflective surface at a second time, the sensor uses the software to identify movement data in any possible mechanical degree of freedom for the objects within the identified volume, wherein the software is configured to use the movement data to categorize the object as static, semi-static, or dynamic.

2. A system according to claim 1, wherein the electro-optical sensor comprises an array of optically sensitive pixels receiving the optical signal and transmitting respective image data signals to the processor for analysis by the software.

3. A system according to claim 1, wherein the first line of sight includes the image data gathered by the reflective surface such that an effective field of view for the electro-optical sensor comprises the first line of sight and at least a portion of the second line of sight.

4. A system according to claim 1, further comprising computer controlled alarm functions stored in the memory and in communication with the processor, wherein the alarm functions are configured to activate an alarm in accordance with predetermined rules established in the software for categories of objects identified by the software with the movement data.

5. The system of claim 1, wherein the identified volume is not within the first line of sight or the second line of sight.

6. The system of claim 1, wherein the electro-optical sensor is a three-dimensional (3D) time of flight camera.

7. The system of claim 6, wherein the three-dimensional (3D) time of flight camera operates at infrared frequencies.

8. A system for classifying objects within an identified volume of space in a vehicle, comprising:
    an electro-optical sensor positioned inside the vehicle with a first line of sight facing toward a rear of the vehicle, the electro-optical sensor in communication with a processor and computerized memory storing computer-implemented imaging software thereon;
    a component in the vehicle comprising a surface sending an optical signal to the electro-optical sensor;
    wherein the surface is within the first line of sight originating from the electro-optical sensor;
    wherein the surface is positioned relative to the identified volume of space such that a second line of sight originating from the surface encompasses at least a portion of the identified volume of space;

an indirect reflective surface defining a third line of sight, wherein the indirect reflective surface is within the second line of sight originating at the surface but is not within the first line of sight originating from the electro-optical sensor, and wherein the third line of sight originating from the indirect reflective surface includes at least a portion of the identified volume that is not in the first line of sight originating with the active electro-optical sensor;

wherein the optical signal reflected from the surface back to the electro-optical sensor comprises image data gathered by the surface via the second line of sight into the identified volume;

wherein if characteristics of the optical signal as reflected by the reflective surface at a first time differ from later characteristics of the optical signal as reflected by the reflective surface at a second time, the sensor identifies movement data corresponding to the objects within the identified volume via the software.

9. The system of claim 8, further comprising:

a second electro-optical sensor positioned inside the vehicle with a different line of sight facing toward a front of the vehicle, the second electro-optical sensor in communication with a respective processor and respective computerized memory storing respective computer-implemented imaging software thereon; and additional components within the vehicle within the different line of sight, the additional components having respective surfaces sending respective optical signals back to the second electro-optical sensor.

10. The system of claim 9, wherein the surface is entirely within the first line of sight of the electro-optical sensor.

11. The system of claim 9, wherein the surface comprises a non-uniform reflectivity configured to send the optical signal back to the electro-optical sensor.

12. The system of claim 9, wherein if characteristics of the optical signal as reflected by the surface at a first time differ from later characteristics of the optical signal as reflected by the surface at a second time, the sensor uses the software to identify movement data corresponding to the objects within the identified volume, wherein the software is configured to use the movement data to categorize the object as static, semi-static, or dynamic.

13. A system for classifying objects within an identified volume of space in a vehicle, comprising:

an electro-optical sensor positioned inside the vehicle with a first line of sight, the electro-optical sensor in communication with a processor and computerized memory storing computer-implemented imaging software thereon;

a component in the vehicle comprising a reflective surface transmitting an optical signal to the electro-optical sensor;

wherein the reflective surface is within the first line of sight originating from the electro-optical sensor;

wherein the reflective surface is positioned relative to the identified volume of space such that a second line of sight originating from the reflective surface encompasses at least a portion of the identified volume of space;

an indirect reflective surface defining a third line of sight, wherein the indirect reflective surface is within the second line of sight originating at the reflective surface but is not within the first line of sight originating from the electro-optical sensor, and wherein the third line of sight originating from the indirect reflective surface includes at least a portion of the identified volume that is not in the first line of sight originating with the active electro-optical sensor;

wherein the optical signal reflected from the reflective surface back to the electro-optical sensor comprises image data gathered by the reflective surface via the second line of sight into the identified volume, and the image data comprises a sufficient resolution to emulate patterns of objects in either the first line of sight or the second line of sight;

wherein if the patterns emulated in the optical signal as reflected by the reflective surface at a first time differ from later characteristics of the optical signal as reflected by the reflective surface at a second time, the sensor identifies movement data corresponding to the objects within the identified volume via the software.

14. The system of claim 13, wherein the patterns are intensity patterns emulated at pixels on the electro-optical sensor.

15. The system of claim 14, wherein the electro-optical sensor is a 3-D time of flight sensor, and the patterns are shown in depth images processed by the software.

16. The system of claim 13, wherein the electro-optical sensor operates at infrared frequencies.

17. The system of claim 13, wherein the electro-optical sensor is positioned inside the vehicle with the first line of sight facing toward a rear of the vehicle.

18. The system of claim 13, wherein the reflective surface is entirely within the first line of sight of the electro-optical sensor.

19. The system of claim 13, wherein the image data is of a resolution that shows a movement pattern corresponding to the objects in the absence of object identification with the image data.

* * * * *